US005131311A

United States Patent [19]

Murakami et al.

[11] Patent Number: 5,131,311

[45] Date of Patent: Jul. 21, 1992

[54] MUSIC REPRODUCING METHOD AND APPARATUS WHICH MIXES VOICE INPUT FROM A MICROPHONE AND MUSIC DATA

[75] Inventors: Nobuo Murakami; Yasuhiro Funahashi, both of Nagoya, Japan

[73] Assignee: Brother Kogyo Kabushiki Kaisha, Nagoya, Japan

[21] Appl. No.: 662,964

[22] Filed: Mar. 1, 1991

[30] Foreign Application Priority Data

Mar. 2, 1990 [JP] Japan .............................. 2-21758[U]

[51] Int. Cl.[5] .......................... G10H 7/00; G11B 7/00

[52] U.S. Cl. ........................................ 84/609; 84/601; 84/625; 84/644; 358/342

[58] Field of Search ................. 84/462, 453, 478, 608, 84/464 R, 626, 609, 600, 601, 602, 603, 645, 625; 369/70, 59, 63; 358/335, 342, 341; 360/72.7

[56] References Cited

U.S. PATENT DOCUMENTS

| | | | |
|---|---|---|---|
| 4,764,822 | 8/1988 | Taniguchi et al. | 360/72.2 |
| 4,771,671 | 9/1988 | Hoff, Jr. | 84/453 |
| 4,992,885 | 2/1991 | Yoshio | 358/342 |
| 4,992,886 | 2/1991 | Klappert | 358/342 |
| 4,995,026 | 2/1991 | Makabe et al. | 84/464 R |
| 5,005,459 | 4/1991 | Adachi et al. | 84/453 |
| 5,016,113 | 5/1991 | Yamashita et al. | 358/335 |
| 5,046,004 | 9/1991 | Tsumura et al. | 84/601 |
| 5,048,390 | 9/1991 | Adachi et al. | 84/464 R |

OTHER PUBLICATIONS

"Standard MIDI Files 1.0" Jul. 1988, The International MIDI Assn., pp. 1-15.

"Designing your MIDI Studio, Part 2: Instrumentation", The IMA Bulletin, Jun./Jul., 1990, vol. 7, No. 4, pp. 1-8 (The Newsletter of the International MIDI Association).

*Primary Examiner*—William M. Shoop, Jr.
*Assistant Examiner*—Helen Kim
*Attorney, Agent, or Firm*—Oliff & Berridge

[57] ABSTRACT

A music reproducing method and apparatus for mixing voices input from a microphone and music data displays various information which represents that a musical performance of a piece of music is entering an interlude inserted between singing -portions, i.e., choruses, or is entering a postlude after the choruses are terminated, the information being provided by a screen display or speaker output of the music reproducing apparatus. The information can inform the user of the end of a song when the musical performance enters the postlude, and can inform the user of the end of singing-portions in the song when the musical performance enters the interlude. The information can be related to the music or the like known to the user.

18 Claims, 9 Drawing Sheets

Fig.8(a)

| XYh + aah + bbh | |
|---|---|
| STATUS DATA | VOICE MESSAGE DATA |
| X = 8h~Fh | (CLASSIFICATION OF STATUS) |
| Y = 0~Fh | (CHANNEL STATUS) |
| aa = 00~7Fh | (NOTE NUMBERS) |
| bb = 00~7Fh | (NOTE-ON VELOCITY) |

MUSIC REPRODUCING METHOD AND APPARATUS WHICH MIXES VOICE INPUT FROM A MICROPHONE AND MUSIC DATA

BACKGROUND OF THE INVENTION

1. Field of the Invention

This invention relates to a music reproducing method and apparatus which mixes voices input from a microphone and music data, and more particularly to a music reproducing method and apparatus in which various information is displayed which represents that a musical performance is in a prelude prior to singing portions or has entered an interlude between singing portions or a postlude after termination of the singing portions.

2. Discussion of the Related Art

A known method for recording music data is a digital recording method using a Pulse Code Modulation (PCM) system or the like. This digital recording method has been applied to a compact disk (CD) or the like. One application of the recording method is in an apparatus for singing to the accompaniment of a reproduced sound, i.e., a karaoke apparatus. In the karaoke apparatus, words to be sung for accompaniment by generated music are displayed on a screen, and the words are changed in such a manner that the displayed words correspond to progression of the generated music.

When using a disk employing the PCM system or the like, the amount of information of both image data and voice data is greatly increased. Therefore, a plurality of disks can be prepared when a user wants to sing many songs.

Meanwhile, when it is desired to display the words on the screen, because of the dimension of the screen and the size of the characters, it is often difficult to entirely display the words on the screen at one time. Since only parts of the words can normally be displayed on the screen, a singer cannot easily recognize the location at which a song being sung by the singer terminates.

Thus, the singer cannot determine whether or not the song is terminated until long after chorus phrases have been sung. When the singer is singing a song on a stage or the like, the singer often prematurely replaces the microphone and is seated before the song is completed.

A piece of music to be sung with the karaoke apparatus has a plurality of choruses. Thus, undesirable conditions are likely to occur as a result of premature termination of the song. Accordingly, a so-called interlude is sometimes inserted between adjacent choruses. This, however, causes the singers to waste time since a singing voice is discontinued for a certain time interval, and no words are displayed on the display screen.

Further, discussions often arise between persons other than the singer when the time interval is lengthy. Such persons discontinue viewing the display screen and cease listening to the song subsequent to two choruses.

OBJECT AND SUMMARY OF THE INVENTION

It is, therefore, an object of the present invention to overcome the above described drawbacks and disadvantages, by providing a music reproducing method and apparatus which mixes voices input from a microphone and music data, wherein a singer can assuredly recognize that the song being sung is completed, particularly when the singer is performing an unfamiliar song.

Another object of the present invention is to provide a music reproducing method and apparatus which mixes voices input from a microphone and music data, wherein general information, such as a new musical composition list, notices required to be known by all the users, or message information including information about the song to be performed by the karaoke apparatus and system, etc. can be distributed by display on a screen or by voice reproduction.

A further object of the present invention is to provide a small-sized music reproducing apparatus which mixes voice input from a microphone and music data.

According to the present invention, there is provided a music reproducing method and apparatus for mixing voice input from a microphone and music data from a memory means. The memory means stores the music data, word data, identification information indicative of the fact that a musical performance of the music data is entering one of an interlude, a prelude and a postlude, and information relating to the music and other information of general interest to the audience. The music reproducing apparatus is connected to the memory means. The method of reproducing music comprises the steps of: reproducing a musical performance-sound signal using a reproducing means, the reproducing being based on music data output from the memory means; displaying words on a displaying means based on the word data output from the memory means; inputting voices from a microphone; outputting from a speaker reproduced acoustic sound obtained from the output of said reproducing means and the output of the microphone; detecting identification information stored in the memory means in order to recognize that a musical performance of the music data is entering one of an interlude, a prelude and a postlude; and indicating general information when said identification information is detected.

The present invention further provides a music reproducing apparatus which mixes input from a microphone and music data, the apparatus comprising: memory means for storing both music data and word data therein, the memory means further storing identification information indicative of the fact that a musical performance of the music data is entering one of an interlude, a prelude and a postlude, the memory means also storing general information; reproducing means, connected to the memory means, for reproducing a musical performance sound signal based on the music data output from the memory means; displaying means, connected to the reproducing means, for displaying words based on the word data output from the memory means; a microphone for inputting the voices thereto, the microphone being connected to the reproducing means; a speaker for outputting reproduced acoustic sound obtained from the output of the reproducing means and the output of the microphone, the speaker being connected to the reproducing means; identification means for identifying information output from the memory means; detecting means, connected one of the memory means and the identification means, for detecting music data identification information; and controlling means for controlling the detecting means and the identification means to display the information stored in the memory means by means of one of the displaying means and the speaker, when the music data identification information is detected by the detecting means.

In the above arrangement, the memory means stores therein the identification information indicative of the fact that the musical performance of the music data is entering one of an interlude, a prelude and a postlude, and the general information including information relating to the music. Therefore, when the identification information is detected, the general information is displayed on the displaying means or output as voices from the speaker. Accordingly, the displaying means or the speaker informs the user, for example, of the end of a song when the musical performance enters the postlude, and also makes the general information known to the user.

BRIEF DESCRIPTION OF THE DRAWINGS

The foregoing and other objects, features and advantages of the present invention will become more apparent by reading the following detailed description of presently preferred embodiments of the present invention, when considered in connection with the accompanying drawings, in which:

FIG. 3(*b*) is a front view of a speaker used in the present invention;

DETAILED DESCRIPTION OF THE PREFERRED EMBODIMENTS

Figure 1:
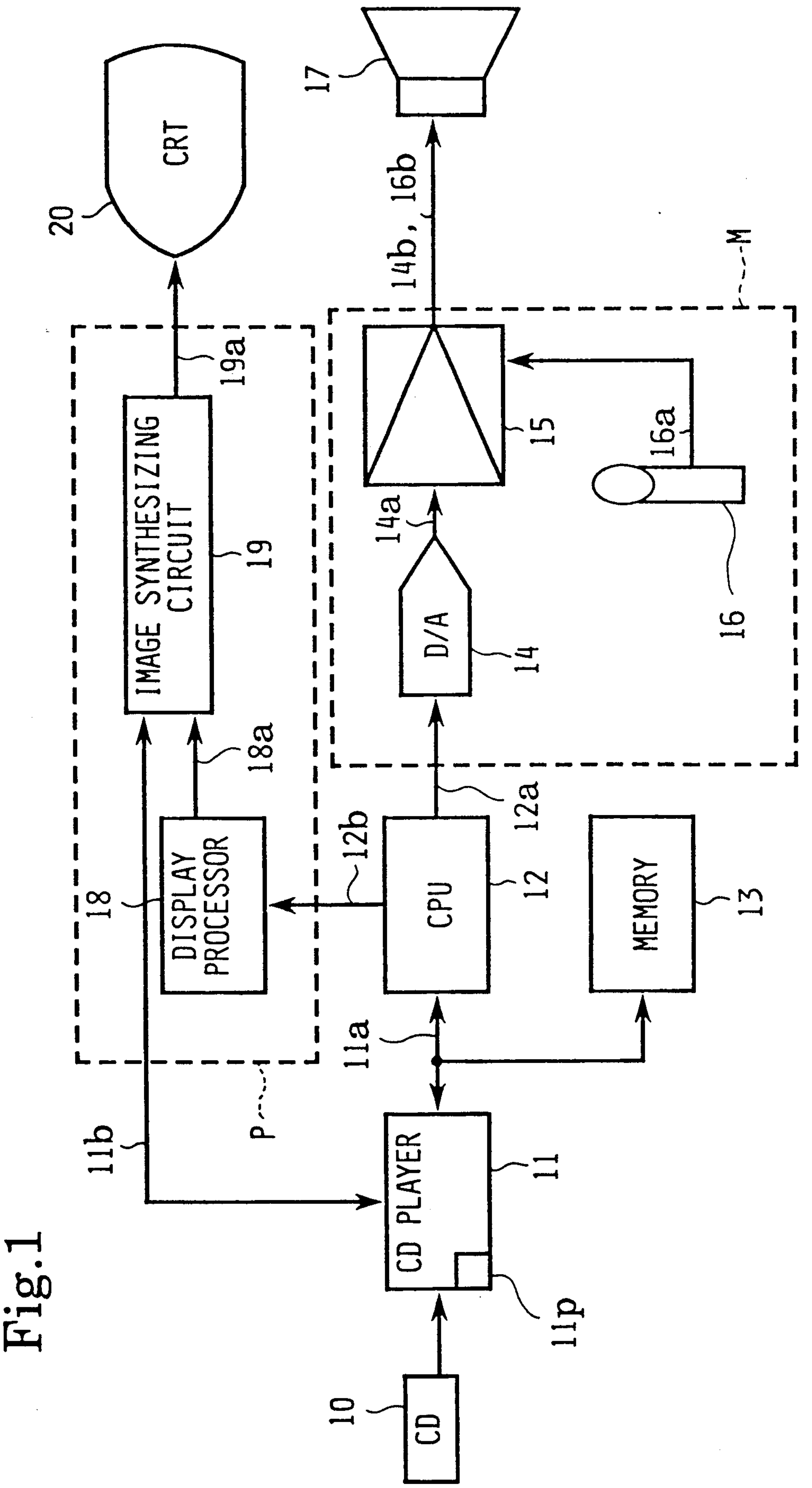
FIG. 1 is a block diagram showing a music reproducing apparatus according to one embodiment of the present invention.

Referring now to the drawings, and particularly to FIGS. 1-5 thereof, one preferred embodiment of the present invention is described.

A compact disk player 11 (hereinafter called "CD player") is provided with a designation key 11*p* for designating a piece of music stored in a compact disk 10 (hereinafter called "CD") to be performed with an apparatus for singing a song to the accompaniment of a reproduced sound, i.e., a karaoke apparatus. The CD player 11 is electrically connected to its associated units such that is reads the contents of music data and image information including words from a CD 10 on which they are stored, and reproduces the music data 11*a* and image information 11*b* to be supplied to a central processing unit (hereinafter called "CPU") 12.

The CPU 12 is connected to respective components as will be described hereinafter so as to control the respective components, which constitute the present music reproducing apparatus.

A memory 13 of the present apparatus is connected to the CPU 12 and stores therein the music data 11*a* read from the CD player 11 based on a command from the CPU 12. The CPU 12, the memory 3 or the like make up a means for reproducing a music performance-sound signal.

A music data processing unit M is provided with a D/A converter unit 14 for converting a digital music data signal output from the memory 13 of the apparatus into an analog signal under the control of the CPU 12. The music data processing unit M has a microphone 16 for inputting voices produced by a user thereto.

The music data processing unit M includes a mixing amplifier 15 for receiving the analog music data signal from the D/A converter unit 14 and the voices from the microphone 16, thereby mixing both the music data and the voices thus received and amplifying the same.

The mixing amplifier 15 is connected to a speaker 17. The speaker 17 is used to output or radiate the mixed analog music data signal from the D/A converter unit 14 and the voice output from the mixing amplifier 15 as a sound wave therefrom into the air.

An image processing unit P is connected to the CPU 12 of the apparatus and is provided with a display processor 18 for effecting display of various information on a screen of a monitor 20 to be described later based on a command from the CPU 12. When the CPU 12 detects chorus end indication data 6 which is described in FIG. 2, and the display processor 18 receives a detection signal for the indication data 6, the display processor 18 provides image information 18*a* stored therein such as information used for indicating the end of a chorus on the screen of the monitor 20 by way of an image synthesizing circuit 19.

The image processing unit P is connected to the CD player 11 of the apparatus so as to receive therein the image information 11*b* output from the CD player 11 in response to the command from the CPU 12. The image synthesizing circuit 19 is provided to synthesize the input image information 11*b* and image information 18*a*.

The image synthesizing circuit 19 is connected to the monitor 20, e.g., a CRT, which provides a display.

Figure 2:
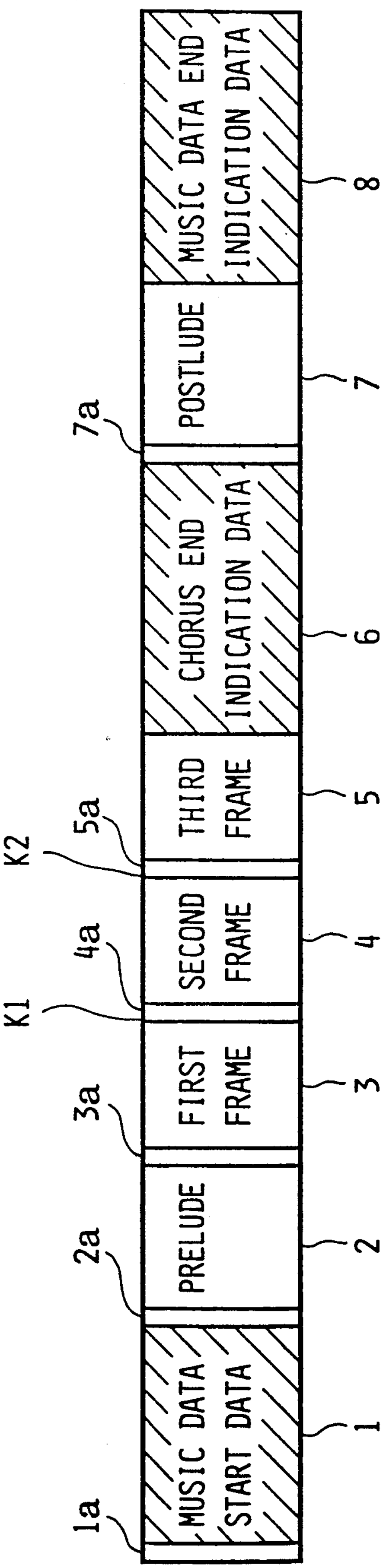
FIG. 2 is a diagram showing the structure of a format illustrative of the contents of music data.

FIG. 2 shows the structure of a format on which image information including music data corresponding to a music selection and the corresponding words which have been stored in the CD disk 10 is recorded.

Referring to FIG. 2, the image information, including the music data corresponding to the piece of music selection and the corresponding words, comprises music start data 1 and image information start data 1*a*, prelude-portion data 2 indicative of the introduction of the music data and image information data 2*a* corresponding to the prelude-portion data 2, data 3 of a first frame and image information data 3*a* corresponding to the data 3, data 4 of a second frame and image information data 4*a* corresponding to the data 4, data 5 of a third frame and image information data 5*a* corresponding to the data 5, chorus end indication data 6 comprising identification information which indicates that a musical performance is entering a postlude after completion of chorus data comprising the data 3, 4, 5, postlude-portion data 7 indicative of the postlude in the music data and image information data 7*a* corresponding to the data 7, and music data end indication data 8 indicative of the end of the music data. The chorus end indication data 6 comprises identification information which represents that a chorus is terminated by a postlude portion.

Figure 3B:
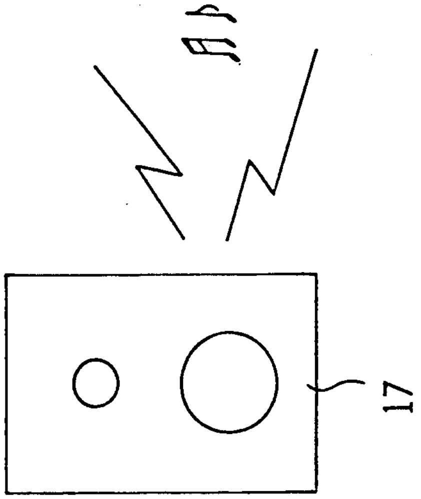
FIG. 3(*a*) is a diagram depicting one example of a visible image displayed on a screen of a monitor when a chorus is terminated.
Figure 3A:
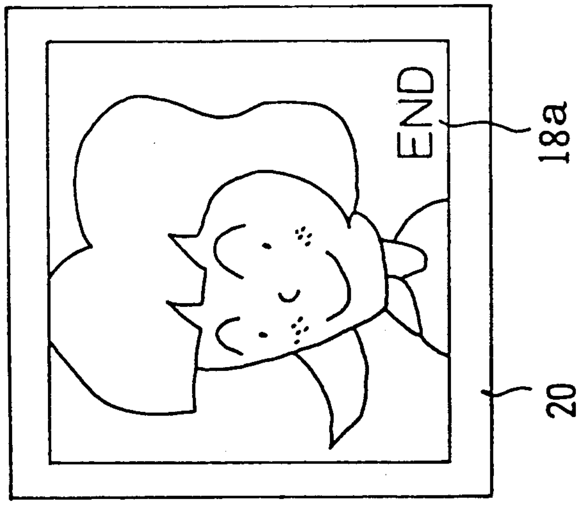

FIG. 3(*a*) shows one example in which the image information 18*a* is output from the display processor 18 by reading the chorus end indication data 6 with the CPU 12. In this example, the message information indicating the end of the chorus is displayed on the screen of the monitor 20.

Figure 4:
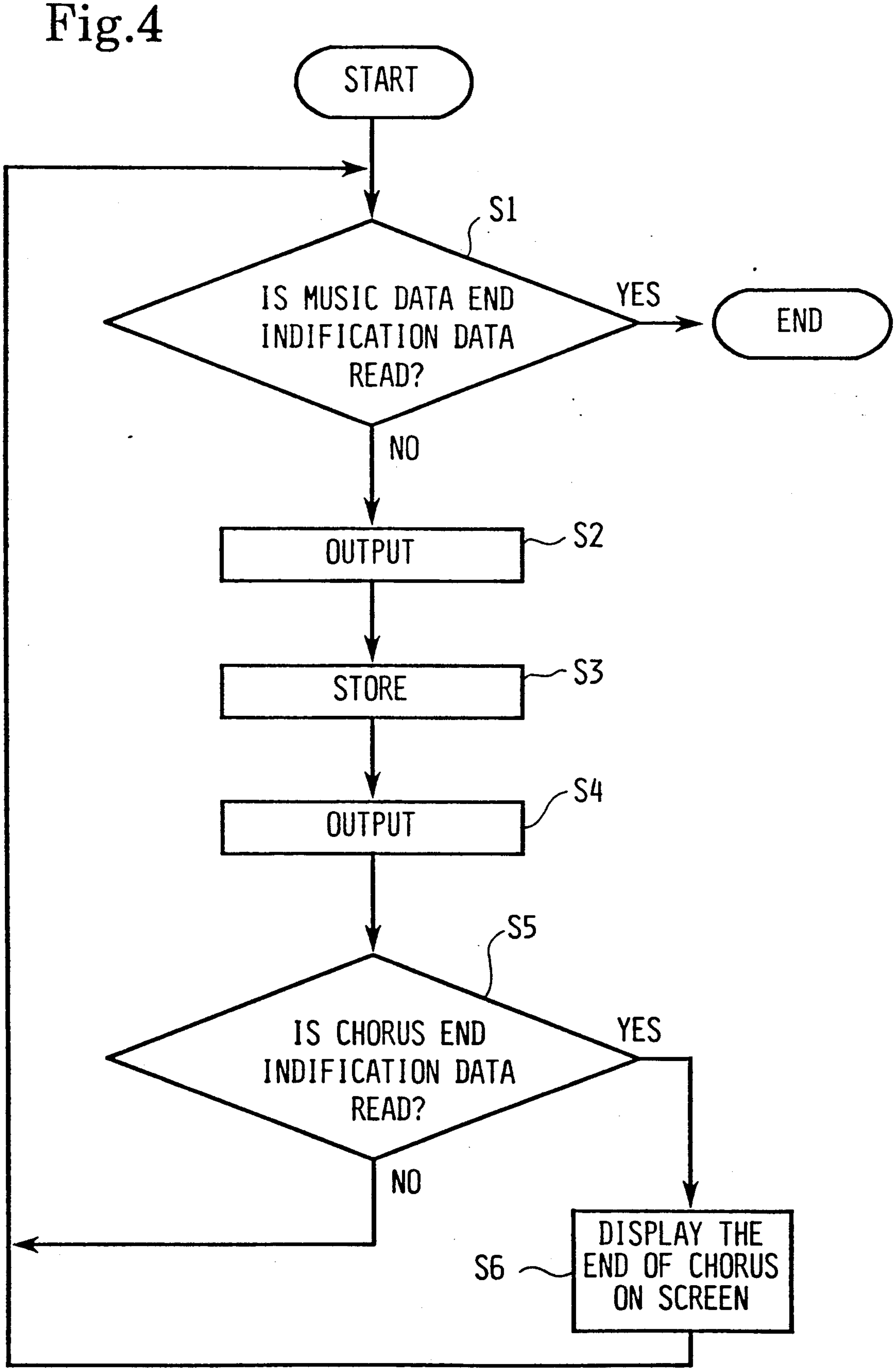
FIG. 4 is a flowchart describing the processing operation of the music reproducing apparatus.

The processing operation controlled by the CPU 12 in the music reproducing apparatus having the above-described construction will now be described with reference to the flowchart shown in FIG. 4.

When a music selection to be performed by the karaoke apparatus is designated by the indication key 11*p* in the CD player 11, the CPU 12 detects whether the music data end indication data 8 has been read (in Step S1). If this is determined to be negative in Step S1, the CPU 12 controls the CD player 11 to output the image information including the music data 11*a* and the words therefrom (in Step S2). Then, the CPU 12 successively stores the music data 11*a* in the memory 13 (in Step S3).

The CPU 12 outputs the image information 11*b* with word information or the like to the image synthesizing circuit 19 (in Step S4).

The CPU 12 successively reads the music data 11*a* from the memory 13 in synchronism with the image information 11*b* and supplies the same to the D/A converter unit 14 as performance data 12*a* (in Step S5).

During the process referred to above, the CPU 12 determines whether the chorus end indication data 6 has been read from the memory 13 (in Step S5). If the chorus end indication data 6 has been read in Step S5, the CPU 12 supplies information 12*b* to display processor 18 (in Step S6), which effects display of characters, marks or the like on the screen 20 in such a manner that a singer can recognize the end of a singing portion.

The display processor 18 outputs indication image information 18*a* including information indicative of the end of the singing portion, to the image synthesizing circuit 19. The image synthesizing circuit 19 synthesizes the information 18*a* and the image information 11*b* with the words so as to supply the thus-synthesized information to the screen of the monitor as a video signal 19*a*.

As a consequence, a word (message) such as "END" shown in FIG. 3 is displayed on the screen of the monitor 20. If the chorus end indication data 6 has not been read in Step S6, the CPU 12 performs the processing of the postlude-portion data 7. When the CPU 12 reads the music data end indication data 8 (if the answer in Step S1 is determined to be positive), the musical performance is terminated.

In addition, the performance data 12*a* is converted into a performance signal 14*a* by the D/A converter unit 14. Then, the performance signal 14*a*, and a voice signal 16*a* input from the microphone 16 are input to the mixing amplifier 15 where they are amplified for output as an amplified performance signal 14*b* and voice signal 16*b*. These signals 14*b*, 16*b* are then input to the speaker 17 so as to be output as a sound wave into the air.

Incidentally, the above-described embodiment has shown and described the CD 10 on which the image information, the music data and the word data are stored. The present invention is, however, not limited to use of the CD. As an alternative, various recording mediums such as a video tape, a video disk, an image memory, etc. may be used as recording means according to alternative embodiments.

The recording means is used as follows. Namely, only a background image on a screen is stored in an image memory or the like. The music data including the identification information described above and the word data are stored in recording means such as an IC memory card, a magnetic floppy disk, etc.

A description has been provided in which when the chorus is terminated and the musical performance enters a postlude, a message for indicating the entry into the postlude is displayed on the screen in the above-described embodiment. As shown in FIG. 2, by way of example, an interlude K1 is inserted between the data 3 of the first frame and the data 4 of the second frame, and an interlude K2 is inserted between the data 4 of the second frame and the data 5 of the third frame. Data representing that the musical performance is entering interludes is thus inserted between chorus data and is stored. When the CPU 12 detects identification information data representing that the musical performance is entering the interlude K1 or K2 inserted between the chorus data, it supplies the thus-detected data 12*b* to the display processor 18.

The display processor 18 may be constructed to display various messages on the screen of the monitor 20. Exemplary messages can be a request for hand clapping, etc., as well as information about the song, information about the performer, number of requests for the song, news, weather, the date, etc. These messages may also be audibly supplied.

Figure 5A:
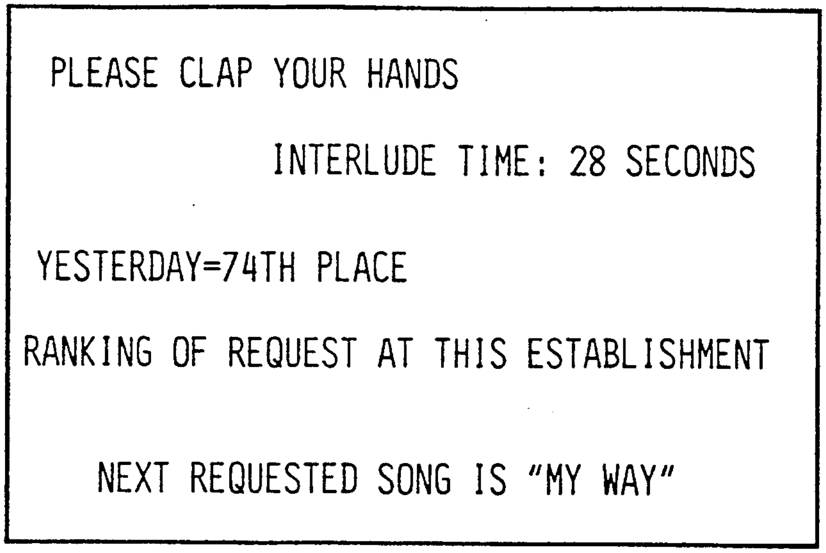
FIG. 5(*a*), 5(*b*), 5(*c*) are diagrams showing examples of displayed messages.
Figure 5B:
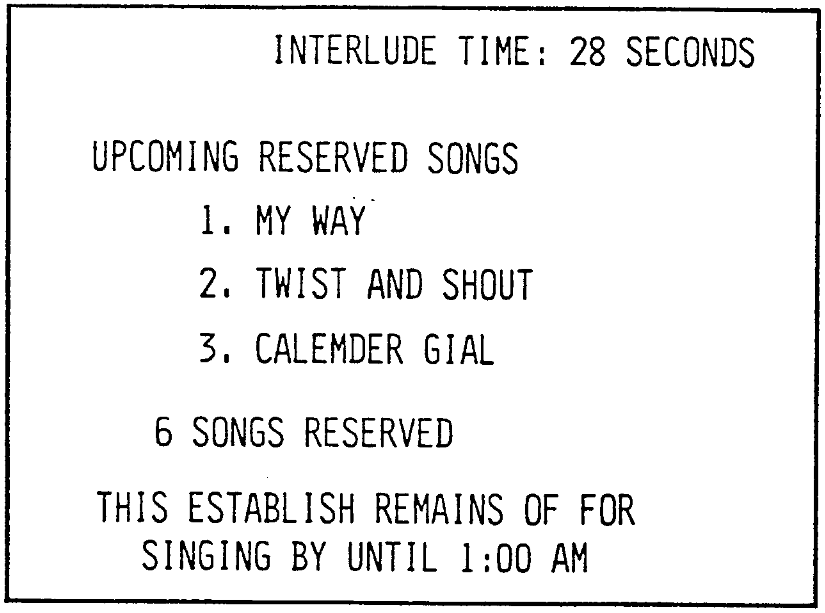
Figure 5C:
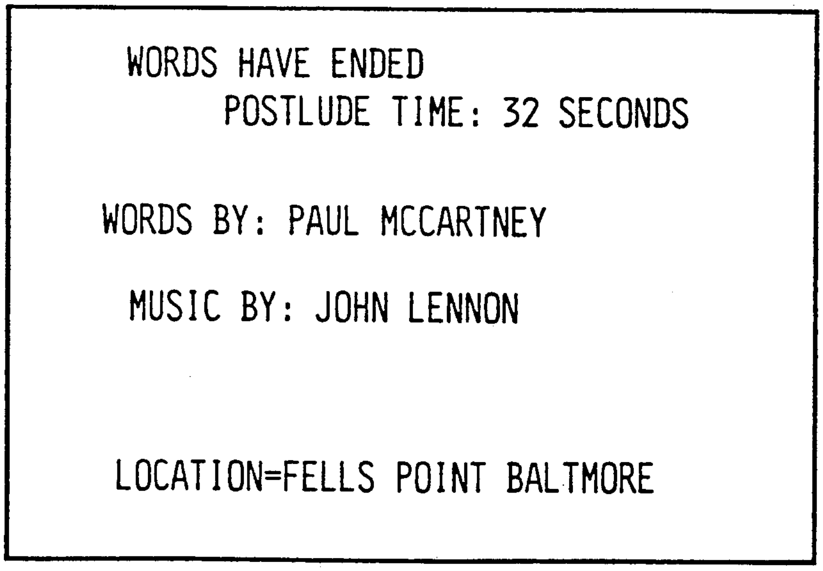

FIGS. 5(*a*), 5(*b*) and 5(*c*) show examples of messages which can be displayed. FIGS. 5(*a*) and 5(*b*) depict the manner in which the messages are displayed when the musical performance enters the interlude. FIG. 5(*c*) illustrates the manner in which the messages are displayed when the musical performance enters the postlude.

A description will now be made of the structure of another embodiment of the present invention with reference to FIG. 6.

Figure 6:
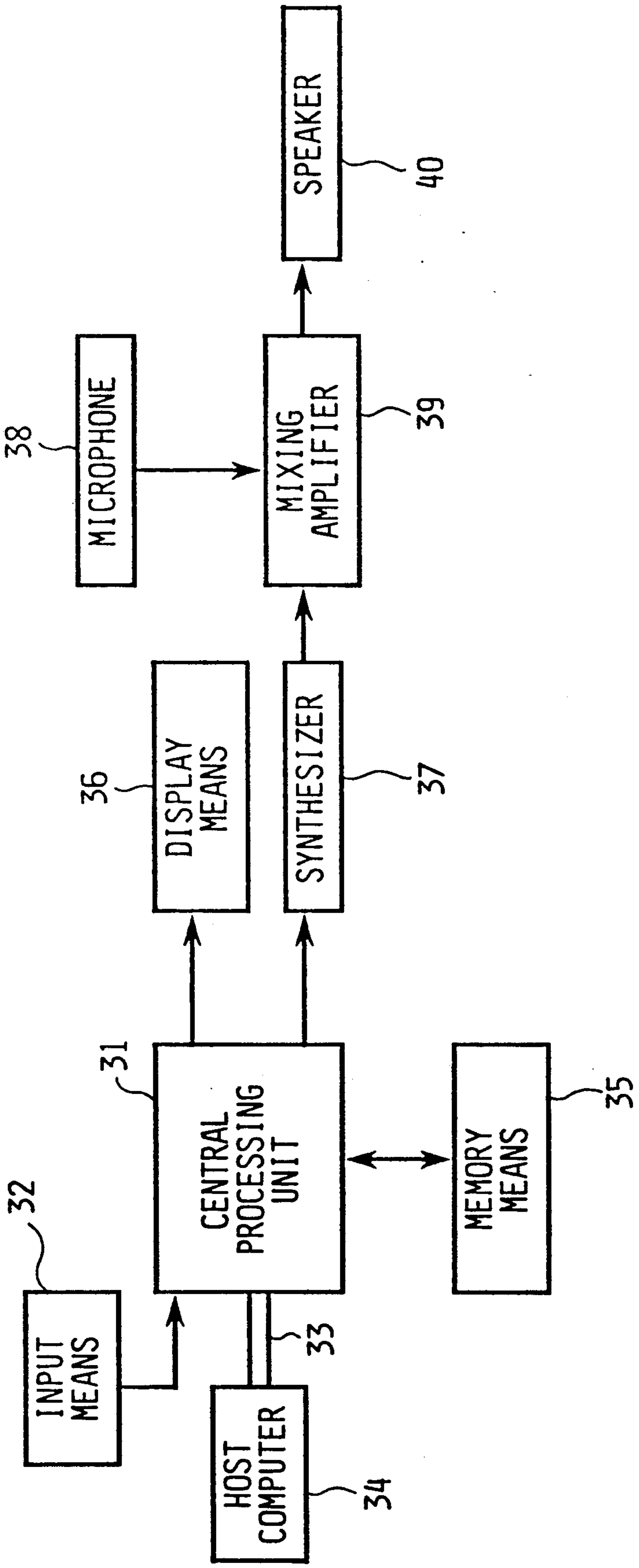
FIG. 6 is a block diagram depicting a music reproducing apparatus according to another embodiment of the present invention, which utilizes communication lines.

Referring now to FIG. 6, a central processing unit 31 reads desired music data, e.g., music information based on the MIDI (MUSICAL INSTRUMENT DIGITAL INTERFACE) standard, from a host computer 34 through a communication line 33 in accordance with a command input from an input means 32. The MIDI standard is a known specific technique of digitally generating music. The MIDI standard is described in the Standard MIDI Files 1.0, July 1988, distributed by the International MIDI Association, the disclosure of which is incorporated by reference herein. It enables manipulation of music data. For example, a song having three choruses can easily be modified to delete the second chorus without creating a gap. Central processing unit 31 downloads or transfers information of the thus-read data to a memory means 35, such as a hard disk, to thereby store the same therein.

When the input means 32 inputs indication data for displaying a music selection that a user wants to sing, general information about the selection, etc. to the central processing unit 31, the central processing unit 31 reads data information corresponding to music data about the music selection (a musical sound to be performed by the karaoke apparatus, words and images), general information about the song, etc. from the memory means 35, and thereafter supplies the data information thus read to a displaying means 36.

The central processing unit 31 causes the displaying means 36 to display images and words for a chorus thereon in synchronism with the generated music. When it is confirmed by the central processing unit 31 that the musical performance has entered, for example, the interlude and the words are not displayed, the central processing unit 31 causes the displaying means 36 to display general information or messages thereon, and causes the displaying means 36 to stop displaying the general information before the words of a next chorus begin.

A musical performance-sound signal output from the synthesizer 37 and a signal indicative of the voice of a singer, which is input through a microphone 38, are amplified by a mixing amplifier 39 to be supplied to a speaker 40 from which the so-processed sound is radiated into the air.

Figure 7:
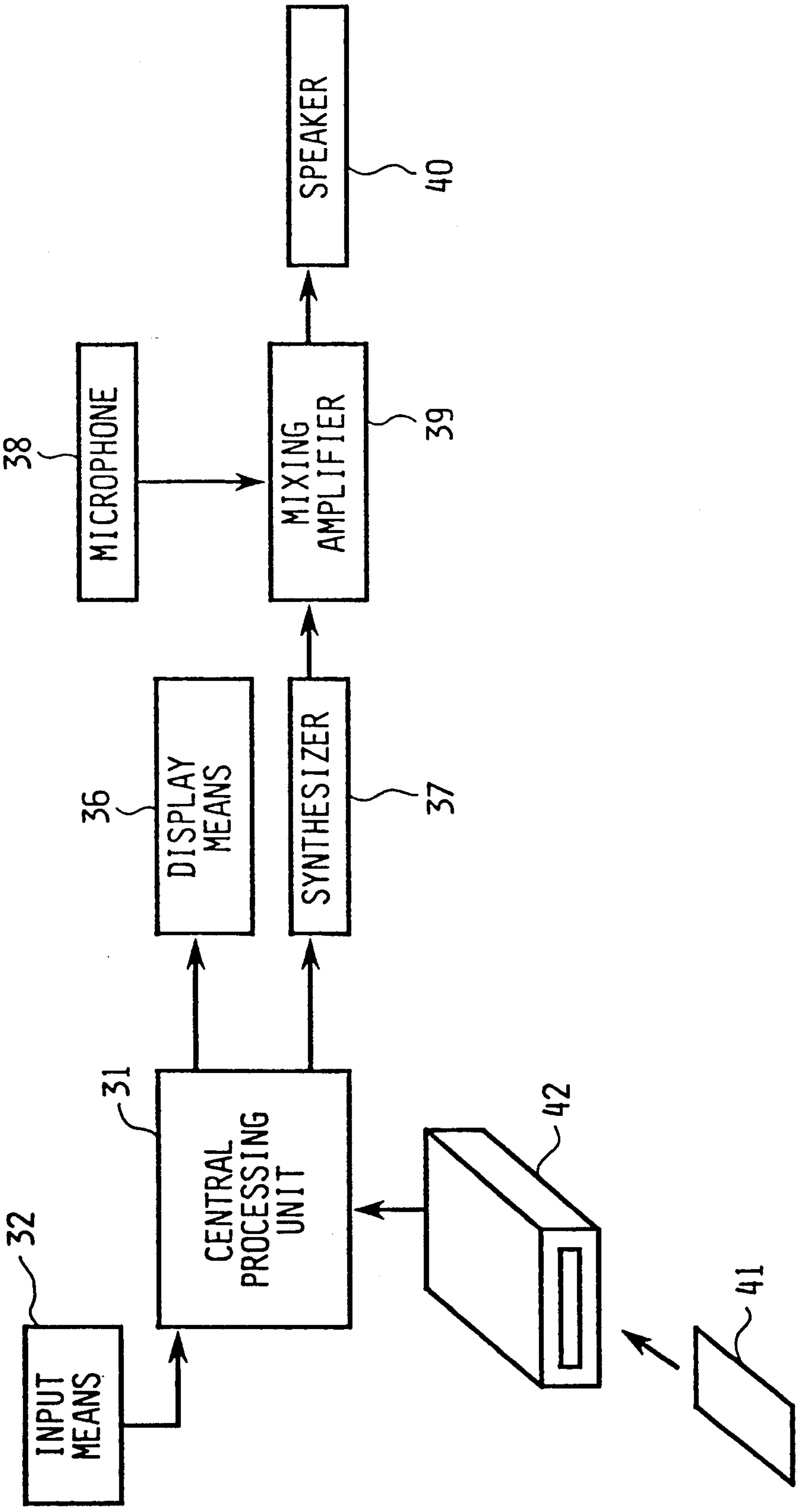
FIG. 7 is a block diagram illustrating a music reproducing apparatus according to a further embodiment of the present invention, which utilizes an IC card.

A description will now be made of the structure of a further embodiment of the present invention with reference to FIG. 7.

The above-described embodiment shown in FIG. 6 describes read out of the desired data from the host computer 34 using the communication line 33 so as to store the so-read data in the memory means 35. However, FIG. 7 illustrates the use of an IC memory card 41, in which various information such as music, word data, etc. has been stored, the IC memory card 41 having semiconductors or the like incorporated therein.

The central processing unit 31 reads the information stored in the IC memory card 41 using a card reader 42 and then outputs a musical performance-sound signal to the synthesizer 37 and word indication data to the displaying means 36.

The central processing unit 31 is so constructed that general information such as message information is automatically displayed when the musical performance enters the interlude between choruses, for example, in the same manner as described above.

MIDI music information may, for example, be stored in the IC memory card 41. Identification information of the MIDI music information, which represents that the musical performance is entering the interlude, etc., inserted between the choruses, may also be stored in the IC memory card 41.

In this case, music data may be stored in a memory means of the IC card 41 in the form of digital data of a format defined by the MIDI standard, for example, and word data may also be stored therein as code information instead of as image information. Thus, according to the present invention, MIDI data can be used with word data.

Figure 8B:
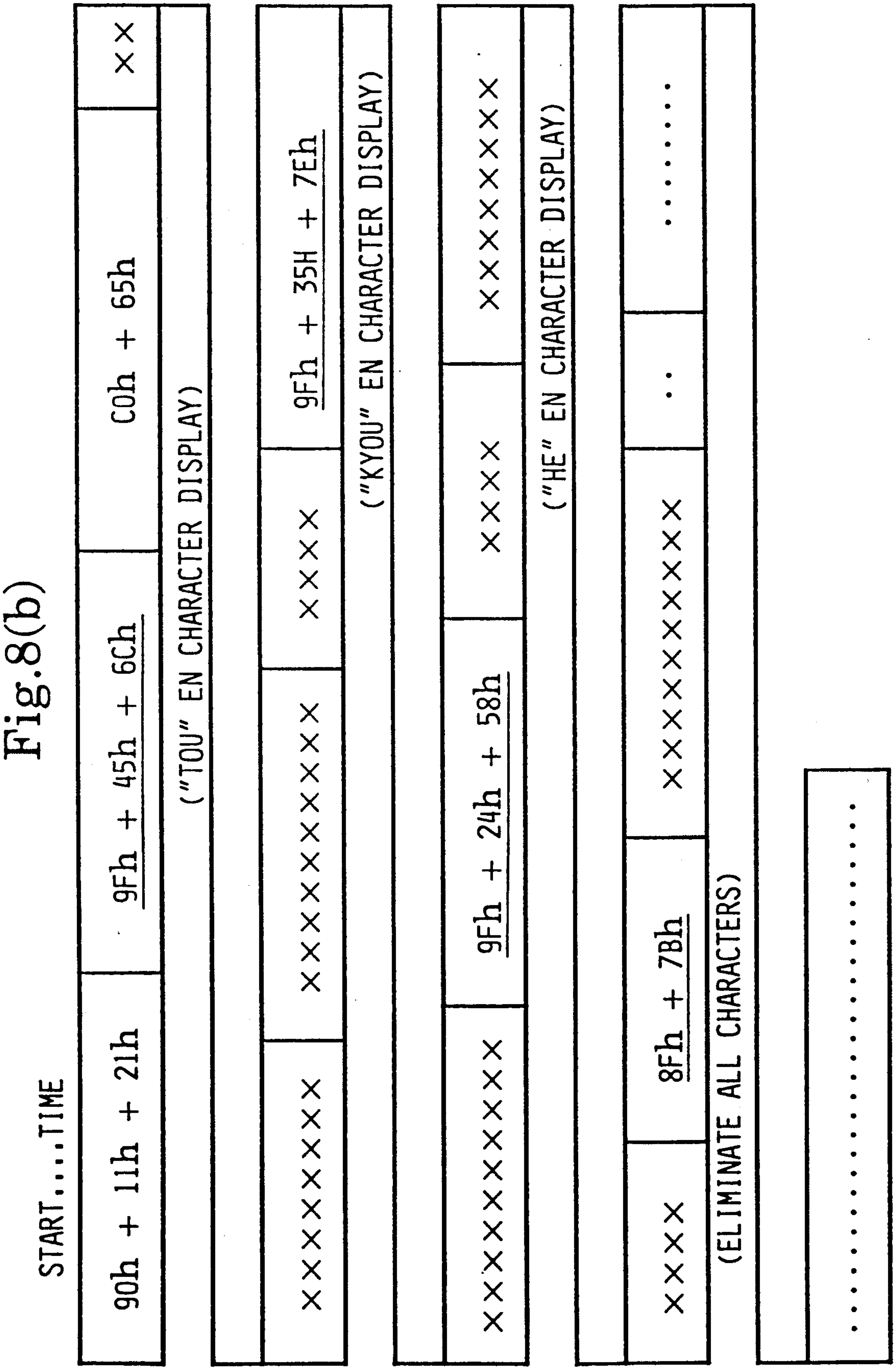
FIG. 8 is a diagram describing the format of the music data.

As shown in FIG. 8(A), musical sound information in the form of the format defined by the MIDI standard comprises status data [XY] of 1 byte and message data [aa +bb] of 2 bytes. The status data [XY] represents the classification X of the messages (for example, channel voice messages, channel mode messages, etc.) and channel numbers Y (from channels 1 to 16) allotted to the synthesizer 37.

Let's now consider musical sound information represented by [9(8)Fh+aah+bbh] for example. In this case, [9(8)Fh] represents "note ON(OFF)" {ON(indicates that a key is struck)/OFF(indicates that the key is not struck) of a note according to the operation of a keyboard} as one of the channel voice messages, and the channel number 16 indicative of a selected channel. [aah +bbh] represents data about the note number (a key number at the time that a C note at the center of the keyboard of a piano is set to 60) and data about the velocity (speed).

Incidentally, the channel 1 is allotted to the synthesizer 37 in the present embodiment. In addition, the data is represented in the form of the hexadecimal code in the drawing.

When message information is stored in a memory means such as a magnetic floppy disk, and identification information representing that a changeover from the music data to the interlude has been made is detected, the message information may be displayed. In doing so, the user can display desired message information on the screen easily and arbitrarily.

When the user does not want to display the message information even in any of the above-described embodiments, it is only necessary to input a command for selecting a message information non-display mode using the input means.

If a storing system of the type referred to above is used, the user can write messages in a memory means of the system arbitrarily and easily. Incidentally, a character generator may be used where it is desired to display characters or the like on the screen based on code information.

According to the present invention described above, the data for indicating the end of the chorus in the music data is stored at the location where the chorus therein is terminated. When the data is read at the time the musical performance is made, the displaying means is used so as to make it possible to inform the singer of the data thus read. Therefore, the singer is not required to guess whether or not a song is terminated. The singer is less likely to prematurely replace the microphone and be seated. In addition, since the audience or listeners can also recognize the end of a chorus, the appropriate time for performing clapping of hands or the like can be determined.

Furthermore, according to the present invention, the identification information representing that the musical performance has entered the interlude or the like inserted between the choruses in the music data is stored, and the general information such as messages to the audience are displayed on the screen during the period in which the interlude or the like is being made. Therefore, the period in which the interlude or the like is occurring can efficiently be utilized, and all the users can enjoy themselves without any sense of dullness.

The present invention further provides a novel device for generating music data using the MIDI techniques in conjunction with picture data.

Having now fully described the invention, it will be apparent to those skilled in the art that many alternatives, modifications and variations can be made without departing from the spirit or scope of the invention as defined in the claims. Accordingly, the preferred embodiments of the invention are intended to be illustrative, not limiting.

What is claimed is:

1. A method of reproducing music using a music reproducing system which mixes voices input from a microphone and music data input from a memory, the music reproducing system being connected to the memory, the memory storing music data, word data, identification information indicative of the fact that a musical performance of the music data is entering one of an interlude inserted between choruses, a prelude prior to the choruses and a postlude following the choruses, and desired message information, the method of reproducing music comprising the steps of:

reproducing a musical performance sound signal based on music data output from said memory means;

displaying words based on the word data output from said memory means;

inputting voices singing the displayed words from a microphone;

outputting reproduced acoustic sound, said reproduced acoustic sound being obtained from the reproduced musical performance sound signal and the input voices;

detecting identification information stored in said memory so that the entry of a musical performance of the music data to one of an interlude, a prelude and a postlude is detected; and indicating said desired message information when said identification information is detected.

2. The method of reproducing music defined in claim 1, including displaying that a musical performance of the music data is entering a postlude when music data end indication information indicative of the end of the music data stored in the memory is detected.

3. The method of reproducing music defined in claim 1, including displaying that a musical performance of the music data is entering an interlude inserted between choruses of a music selection when indication information indicative that a music interlude is stored in the memory is detected.

4. The method of reproducing music defined in claim 1, including displaying that a musical performance of the music data is entering a prelude when indication information indicative that a music prelude is stored in the memory is detected.

5. The method of reproducing music defined in claim 1, including displaying that a musical performance of the music data is entering a chorus end when indication information indicative that a music chorus end is stored in the memory is detected.

6. The method of reproducing music defined in claim 1, wherein the music data comprises music instrument digital information.

7. The method of reproducing music defined in claim 1, wherein the word data is formed of code information.

8. The method of reproducing means defined in claim 1, wherein said desired message information is selected from information relating to music information about the performer and specific messages directed to an audience.

9. The method of reproducing means defined claim 1, wherein said indicating is performed by a visual display.

10. The method of reproducing music defined in claim 1, wherein said indicating is performed by audible output.

11. A music reproducing apparatus which mixes voices input from a microphone and music data, the apparatus comprising:

memory means for storing both music data and word data therein, said memory means storing identification information indicative that a musical performance of the music data is entering one of an interlude, a prelude and a postlude, and said memory means further storing desired message information;

reproducing means, connected to said memory means, for reproducing a musical performance-sound signal based on music data output from said memory means;

displaying means, connected to said reproducing means, for displaying words based on word data output from said memory means;

a microphone for providing the voice input, said voice input comprising voices singing the displaying words, the microphone being connected to said reproducing means;

a speaker for outputting reproduced acoustic sound obtained from the musical performance sound signal and the voice input, the speaker being connected to said reproducing means;

identification means for identifying general information output from said memory means;

detecting means, connected to one of said memory means and said identification means, for detecting said identification information; and controlling means for controlling said detecting means and said identification means to display said desired message information stored in said memory means using one of said displaying means and said speaker when said identification information is detected by said detecting means.

12. The music reproducing apparatus defined in claim 11, wherein the music data is formed of music instrument digital information.

13. The music reproducing apparatus defined in claim 11, wherein the word data is formed of code information.

14. The music reproducing apparatus defined in claim 11, wherein the displaying means displays that a musical performance of the music data is entering a postlude when the detecting means detects music-data end indication information indicative of the end of the music data stored in the memory means.

15. The music reproducing apparatus defined in claim 1, wherein the displaying means displays that a musical performance of the music data is entering an interlude inserted between choruses of a piece of music when the detecting means detects indication information indicative that a music interlude is stored in the memory means.

16. The music reproducing apparatus defined in claim 11, wherein the displaying means displays that a musical performance of the music data is entering a prelude when the detecting means detects indication information indicative that a music prelude is stored in the memory means.

17. The music reproducing apparatus and system defined in claim 11, wherein the displaying means displays that a musical performance of the music data is entering a chorus end when the detecting means detects indication information indicative that a music chorus end is stored in the memory means.

18. The music reproducing apparatus defined in claim 11, wherein said identification means identifies said desired message information selected from information relating to the music, information about the performer and specified messages directed to an audience.

* * * * *